United States Patent
Richardson

(10) Patent No.: US 9,828,982 B1
(45) Date of Patent: Nov. 28, 2017

(54) ELECTRIC PUMP AND DELIVERY TUBE FOR PERSONAL HYDRATION SYSTEM

(71) Applicant: Sporting Innovations, LLC, San Diego, CA (US)

(72) Inventor: Kent Richardson, San Diego, CA (US)

(73) Assignee: Sporting Innovations, LLC, San Diego, CA (US)

( * ) Notice: Subject to any disclaimer, the term of this patent is extended or adjusted under 35 U.S.C. 154(b) by 192 days.

(21) Appl. No.: 14/747,729

(22) Filed: Jun. 23, 2015

Related U.S. Application Data

(60) Provisional application No. 62/016,544, filed on Jun. 24, 2014.

(51) Int. Cl.
*A45F 3/20* (2006.01)
*A45F 3/00* (2006.01)
*F04B 43/04* (2006.01)
*H01H 35/24* (2006.01)
*F16K 15/14* (2006.01)

(52) U.S. Cl.
CPC .............. *F04B 43/04* (2013.01); *A45F 3/20* (2013.01); *H01H 35/245* (2013.01); *A45F 2003/001* (2013.01); *F16K 15/145* (2013.01)

(58) Field of Classification Search
CPC ...... F04B 43/04; A45F 3/20; A45F 2003/001; F16K 15/145; H01H 35/245
See application file for complete search history.

(56) References Cited

U.S. PATENT DOCUMENTS

| | | |
|---|---|---|
| 4,095,726 A | 6/1978 | Hechler, IV et al. |
| 4,420,097 A | 12/1983 | Motsenbocker |
| 4,807,813 A * | 2/1989 | Coleman ............... A63H 33/28 222/175 |
| 4,948,023 A | 8/1990 | Tripp |
| 5,060,833 A | 10/1991 | Edison et al. |
| 5,085,349 A | 2/1992 | Fawcett |
| 5,282,557 A | 2/1994 | McCook |
| 5,427,290 A | 6/1995 | Thatcher |
| 5,645,404 A | 7/1997 | Zelenak |
| 5,722,573 A | 3/1998 | Carnel |
| 5,727,714 A | 3/1998 | Fawcett |
| 5,806,726 A | 9/1998 | Ho |
| 5,864,880 A | 2/1999 | Adam |
| 5,911,406 A | 6/1999 | Winefordner et al. |
| 5,941,640 A | 8/1999 | Thatcher |
| 5,975,387 A | 11/1999 | Gleason et al. |
| 5,984,145 A | 11/1999 | McAllister |

(Continued)

*Primary Examiner* — Frederick C Nicolas
(74) *Attorney, Agent, or Firm* — ColterJennings

(57) ABSTRACT

An in-line pump assembly attachable to a hydration bladder includes an electrically driven pump held in a casing and placed in the flow of hydrating liquid. The pump connects to the outlet of the hydration system. Bulbs at the respective ends of a switch line hold an essentially incompressible liquid. Pinching a bite valve bulb on the output end of the drinking tube cause a switch line bulb on the other end of the switch line to expand, closing a pressure switch and causing the pump to pump liquid from the hydration bladder through the drinking tube. Releasing the bite valve bulb reduces the pressure in the switch bulb, disengaging the switch and stopping the flow of liquid. The in-line pump assembly may be connected to a preexisting hydration system through an adapter.

15 Claims, 4 Drawing Sheets

(56) References Cited

U.S. PATENT DOCUMENTS

| | | | |
|---|---|---|---|
| 6,032,831 A | | 3/2000 | Gardner et al. |
| 6,039,305 A | | 3/2000 | Hoskins et al. |
| 6,990,860 B1 | * | 1/2006 | Gillanders ................ A45F 3/20 222/175 |
| 7,007,826 B2 | | 3/2006 | Shapanus et al. |
| 7,073,688 B2 | | 7/2006 | Choi et al. |
| 8,220,664 B1 | | 7/2012 | Teetzel et al. |
| 2004/0045980 A1 | | 3/2004 | Robbins |
| 2007/0272710 A1 | * | 11/2007 | Bui ...................... B01L 3/0265 222/207 |
| 2010/0237096 A1 | * | 9/2010 | Wegelin ............... A47K 5/1217 222/52 |
| 2013/0119083 A1 | * | 5/2013 | Ophardt ............... A47K 5/1204 222/64 |

\* cited by examiner

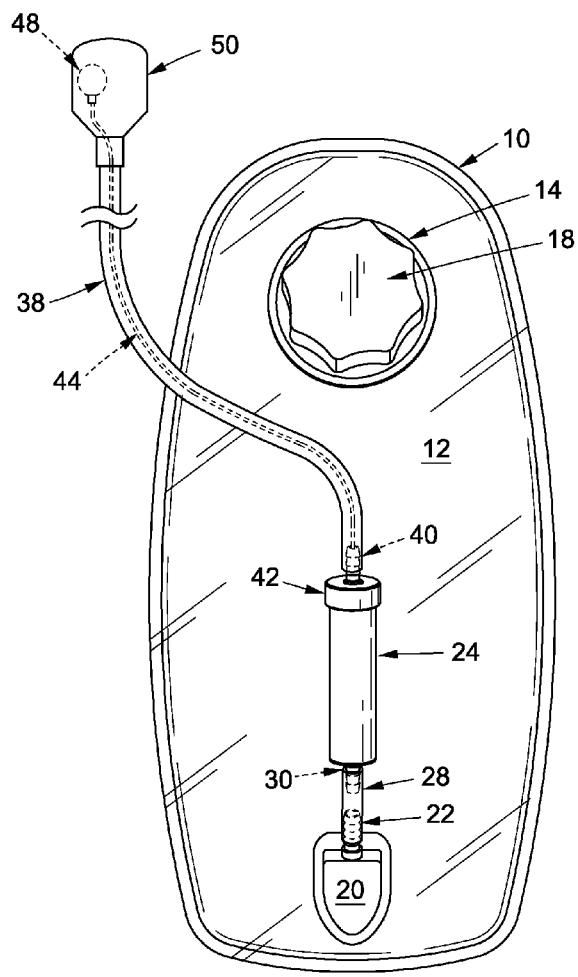
FIG. 1
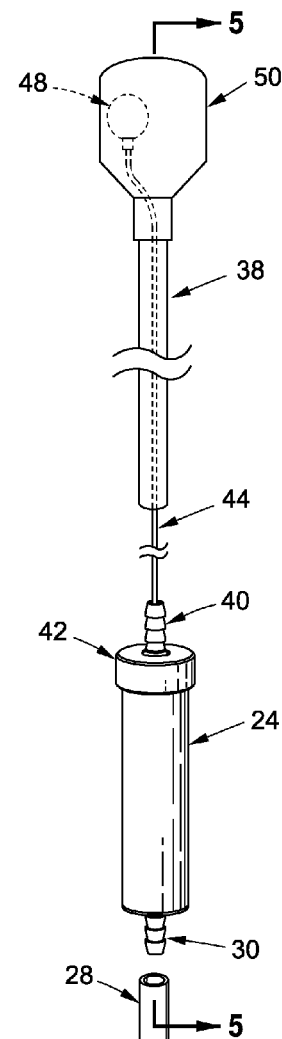
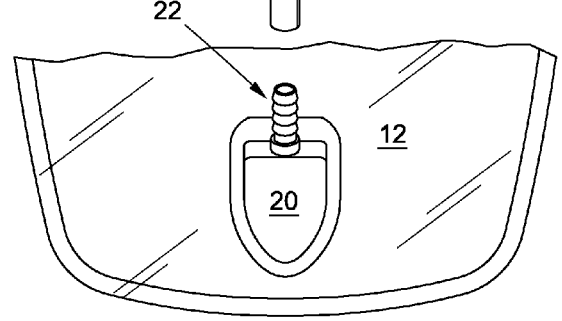
FIG. 2

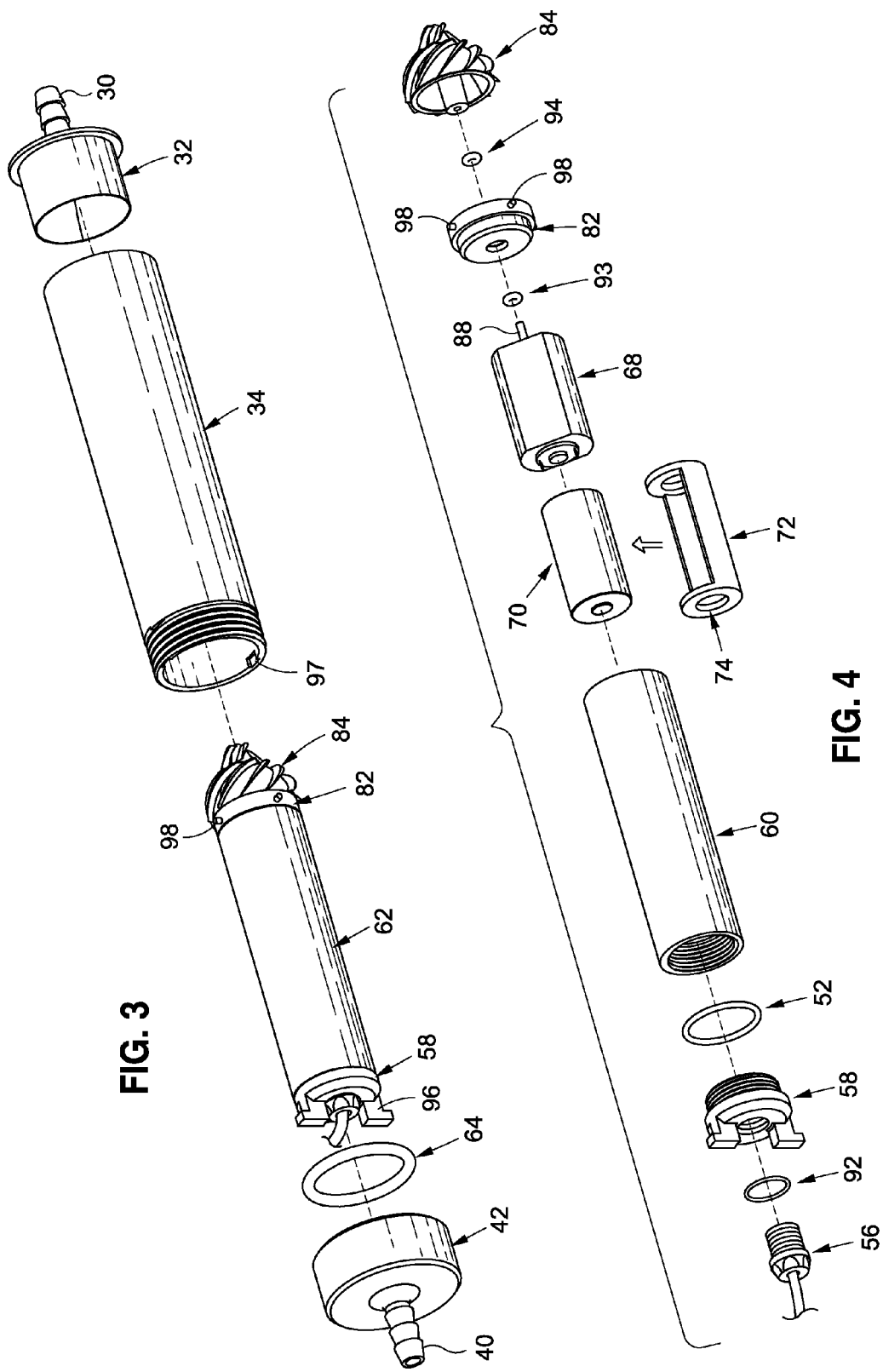

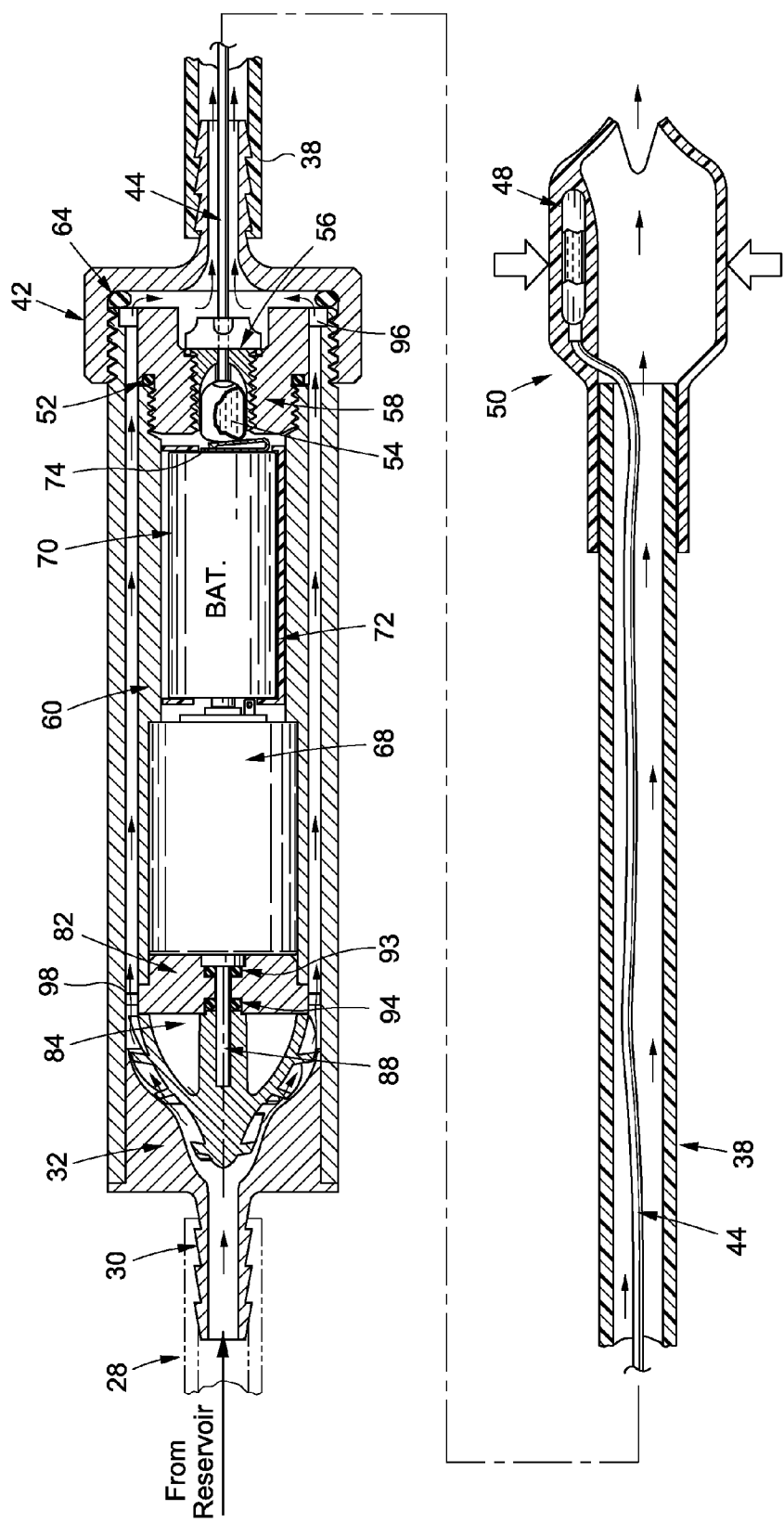

ELECTRIC PUMP AND DELIVERY TUBE FOR PERSONAL HYDRATION SYSTEM

CROSS-REFERENCE TO RELATED APPLICATIONS

This application claims priority based on U.S. Provisional Patent Application Ser. No. 62/016,544 filed Jun. 24, 2014 and titled "PUMP AND DELIVERY TUBE," the disclosure of which is incorporated herein in its entirety by this reference.

BACKGROUND

This application relates generally to personal hydration systems, such as backpacks that carry water for use during exercise, and in particular to an electrically powered pump and a delivery tube that may be affixed to a hydration bladder of a personal hydration system. Such hydration systems are often used by participants in cycling, hiking, racing, skiing and other outdoor activities.

When exercising, participants often want to carry water or another hydrating liquid. This is particularly true when the participant is going a significant distance between possible water stops. Often, people do not want to carry a rigid or semi-rigid water bottle in their hands or backpacks.

Therefore, there are a number of hydration devices on the market today that improve upon the rigid water bottle commonly seen on bicycles and found in the backpacks of hikers. These hydration devices typically carry a larger volume of liquid, often use flexible bladders to hold the liquid, and typically have a tube coming out of the bladder from which the liquid can be dispensed. Hence, these hydration devices can be effective in keeping the end user hydrated during physical exercise or during hot weather. Examples of such devices are disclosed in U.S. Pat. Nos. 4,095,726; 4,420,097; 4,948,023; 5,060,833; 5,085,349; 5,282,557; 5,427,290; 5,645,404; 5,727,714; 5,722,573; 5,806,726; 5,864,880; 5,911,406; 5,941,640; 5,975,387; 5,984,145; 6,032,831; 6,039,305; 7,007,826; and 8,220,664; the entire disclosures of which are incorporated herein by this reference.

These hydration devices have other ancillary uses. For example, a larger hydration device that delivers liquid under pressure on demand would also be convenient in sharing of the liquid with a thirsty friend, washing out a wound, or washing dirt or mud off of a surface. These ancillary uses can be tricky when the liquid must be suctioned out, forced out by pushing on the bladder, or require gravity to cause the liquid to flow. Attaching a pump, such as a pump powered by squeezing or other exertion by the user, further complicates use of the hydration system because the pump interferes with many physical activities. In addition, prior devices may be difficult for athletes involved in physical exertion and high respiration rates to use. During such activity, it may take significant effort to stop breathing and to suck liquid from the hydration system.

Another prior attempt to provide liquid under pressure on demand involved including a tank or bladder, of air under pressure, attached to the regular hydration bladder of liquid (which in effect squeezes the hydration liquid bladder) to force the liquid through the output tube. Adding the additional volume of an air pressure bladder is wasteful of the limited space and inconvenient. In addition, the pressure curve (of the stored air pressure bladder) goes downward as liquid is used and thus must be periodically pumped up during the emptying of just one bladder. This causes the pressure of the liquid stream to be inconsistent. That is, the output stream of water from the bladder starts out strong but the pressure goes down with each use and is typically insufficient to empty a whole bladder of water, thus requiring the end user to carry a pump and to devote time and effort to re-pressurizing the system.

Thus, considerably less energy may be expended if the liquid from the hydration system could be automatically pumped through the drinking tube without the user expending significant effort or time. Such a system may give a competing athlete a measurable advantage over competitors. Furthermore, such a system would permit easy sharing of liquids with a friend, and may permit washing of a wound or dirty surface with what amounts to a low pressure stream of water.

SUMMARY

According to the present disclosure, a small, light-weight, in-line pump assembly connects to the existing liquid output port of the bladder of a hydration unit. The in-line pump assembly attaches to a drinking tube through which a user may suck water (or other liquid) from the bladder. A casing in the in-line pump assembly contains an electrically driven fluid delivery pump that is configured to pump liquid from the bladder and through the in-line pump assembly and the drinking tube to the user.

According to one embodiment, an expanding and contracting bulb system inside the delivery tube activates the fluid delivery pump by simply pressing a bite valve. That is, a switch line runs inside the drinking tube from the pump casing to a bite valve at the output end of the drinking tube or delivery tube. An expandable switch bulb affixed to the end of the switch line extends into the casing. The switch bulb abuts a pressure switch, so that when liquid is forced into the switch bulb, the switch bulb expands and the switch is closed, thereby activating the pump.

The bite valve at the delivery end of the switch line contains a bite valve bulb. When a user has the delivery end of the drinking tube in their mouth, the user may bite down on the bite valve, which will cause the liquid in the bite valve bulb to flow out of that bulb and into the switch bulb at the other end of the switch line. The liquid in the switch line is essentially incompressible, and thus when the user bites the bite valve, that liquid pressure causes the switch bulb (on the other end of the switch line) to expand, thereby closing the pressure switch. This design has the advantage of not having electricity in the bite valve and therefore in the user's mouth (or anywhere around the user's mouth).

The present in-line pump assembly may be designed, with appropriate different adapters, to attach to multiple brands of hydration systems and therefore is an accessory to the personal hydration system. The pump and delivery hose can be quickly attached or removed. Furthermore, in the event that the battery is discharged or depleted, the user may continue to suck fluid from the hydration system even after the energy source for the pump is depleted.

While any of these advantages are possible, it may be the case that only some or even none of them are made use of in connection with the present invention. Whatever the case, the present invention includes systems comprising any of these features described herein. Methodology described in association with the devices disclosed also forms part of the invention. The invention further comprises such hardware and methodology as may be used in connection with that described, all of which is incorporated by reference.

BRIEF DESCRIPTION OF THE DRAWINGS

Other features and advantages of the present invention will be apparent from the following Detailed Description taken in conjunction with the accompanying Drawings, in which:

FIG. 1 depicts a plan view of a hydration bladder with the present pump and tube apparatus attached thereto;

FIG. 2 depicts an exploded view of the pump and tube apparatus depicted in FIG. 1;

FIG. 3 depicts an exploded view of an in-line pump assembly of the apparatus depicted in FIG. 1;

FIG. 4 depicts an exploded view of a pump of the present apparatus according to one embodiment;

FIG. 5 depicts a cross-sectional view of the pump housing, pump and tube of the apparatus depicted in FIG. 1 according to one embodiment.

DETAILED DESCRIPTION

Figure 6:
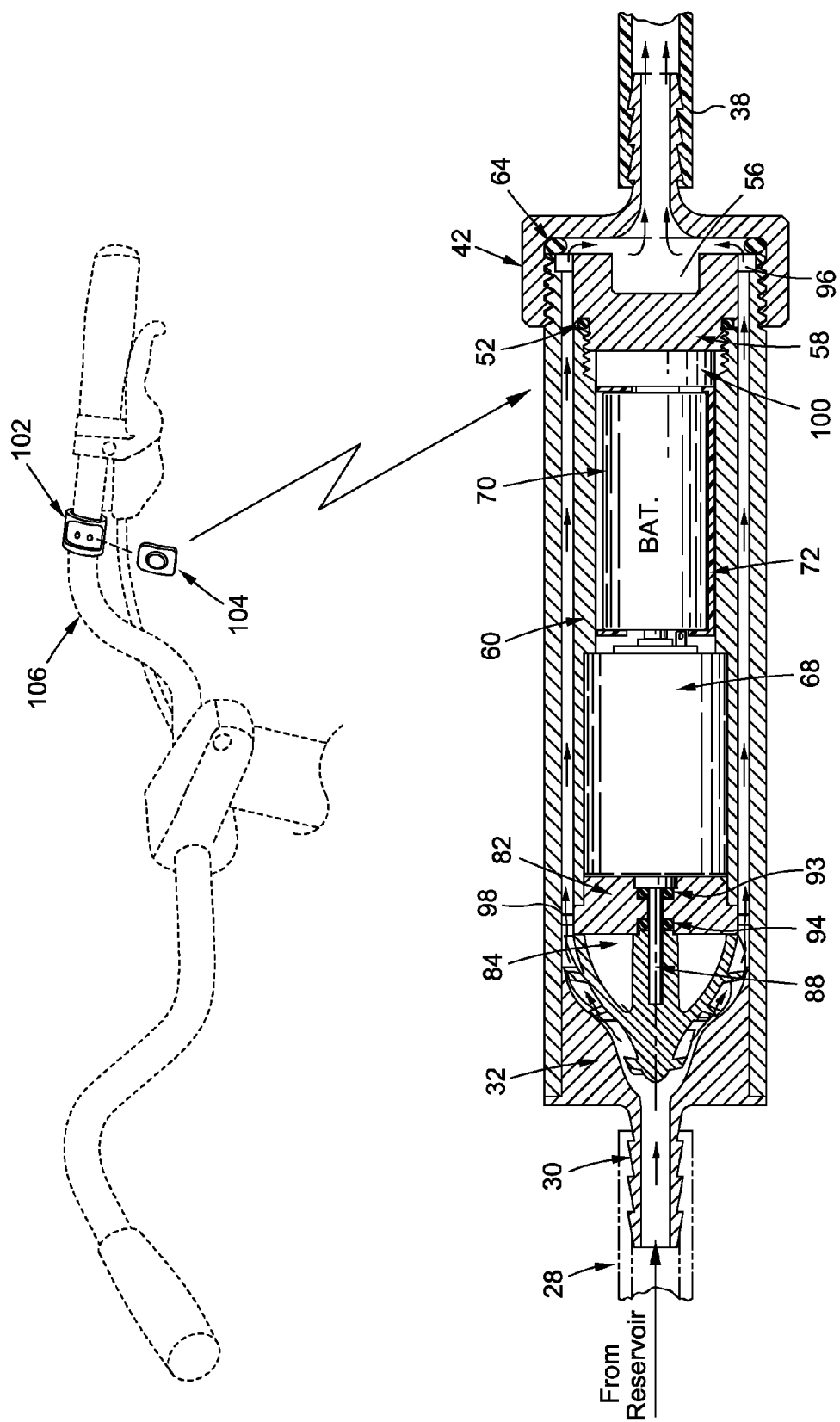
FIG. 6 depicts a switching mechanism for the pump and tube apparatus depicted in FIG. 1 according to another embodiment.

As depicted in FIG. 1, a typical personal hydration system 10 comprises a bladder 12 having a input port 14 that may be sealed by a screw-on cap 18. To fill the bladder, the cap is screwed off, liquid is poured into the bladder, and the cap is screwed back on to the bladder. The bladder also has a drain port 20 from which the liquid is dispensed out of the bladder. In the embodiment shown in the FIGURES, the drain port includes a bladder connection barb 22 to which a drinking tube of appropriate diameter may be attached. In other embodiments, a quick release mechanism is formed or attached as part of the drain port.

According to the present disclosure, an in-line pump assembly 24 may be connected to the bladder connection barb 22 (or other mechanism) of a new or existing hydration bladder 12. The in-line pump assembly 24 includes a pump and a tube to assist in delivery of liquid from the bladder to a user. In the embodiment depicted in FIGS. 1 and 2, a short adaptation tube 28 is removably mounted between the bladder connection barb 22 and a pump input connection barb 30 formed on a tapered end cap 32 at the input end of an outer pump housing 34 (see FIG. 3). Although the adaptation tube 28 is depicted in FIGS. 1 and 2, depending on the style or manufacturer of the bladder 12, the connection between the bladder and the pump housing may take the form of a quick release mechanism or other design that is compatible with the bladder.

A drinking tube 38 is removably mounted to a pump output connection barb 40 that is formed on an output end cap 42 formed in, or affixed to, the second end (or output end) of the pump housing 34. Again, different connection mechanisms may be used. Inside (or mounted alongside, in other embodiments) the drinking tube 38 resides a removable, flexible, hollow switch line 44 with expandable bulbs formed or attached on each end. One bulb, a bite valve bulb 48, fits into a bite valve 50 on the delivery end of the drinking tube 38. The other expandable bulb, a switch bulb 54 (see FIG. 5), is mounted in a switch bulb holder 56 held inside the inner pump cap 58 that is attached to the pump housing 34 (see FIG. 4).

As depicted in FIG. 3, the in-line pump assembly 24 comprises the outer pump housing 34 having, at the input end of the outer pump housing, the tapered end cap 32 with formed pump input connection barb 30. The output end cap 42 with formed pump output connection barb 40 attaches to the opposite end of the outer pump housing 34, typically with an O-ring 64 to seal liquid inside the housing.

A pump 62 is held within the housing 34. As depicted in FIGS. 4 and 5, the pump 62 includes a motor 68 that is powered by a battery 70 (or other energy store). The battery may be kept in place by a battery holder 72 on which a pressure switch 74 is also attached. In the embodiment depicted in FIG. 4, the motor and battery are held within a pump casing 60 that is sealed off from the hydration liquid at one end by an O-ring 52 and the inner pump cap 58 and at the opposite end by a press-fit lower pump cap and stabilizer 82. In this embodiment, the switch bulb holder 56 screws into the inner pump cap 58, and is typically sealed with the assistance of an O-ring 92.

A multi-bladed impeller 84 is mounted on the drive shaft 88 of the motor 68. The impeller is shrouded by the tapered end cap 32. In the embodiment depicted in FIG. 5, for efficiency, the taper of this end cap typically matches or closely matches the contour of the impeller, but other embodiments could be implemented, to vary the flow characteristic of the hydration liquid, that did not follow the contour of the end cap. According to this embodiment, the lower pump cap and stabilizer 82 is press-fit into the pump casing 60. O-rings 93 and 94 are placed on the motor shaft 88 on both sides of the lower pump cap and stabilizer 82 to help seal the entry end of the pump 62. The other (exit) end of the pump 62 is sealed from the hydration liquid being pumped by the inner pump cap 58, typically with the O-ring 52 between the inner pump cap and the casing 60.

As depicted in FIGS. 3 and 5, two arms 96 formed on the inner pump cap 58 fit flush into notches 97 formed on the inside of the outer pump housing 34 to prevent the pump 62 from twisting within the outer pump housing 34. This flush fitting allows the O-ring 64 to seal between output end cap 42 and outer pump housing 34. Posts 98 formed in the lower cap and stabilizer 82 abut against the interior diameter of the outer pump housing 34 to center and to stabilize the lower end of the pump 62 so that the impeller 84 blades do not rub or come in contact with either the outer pump housing 34 or the tapered end cap 32. Alternatively, stabilizing vanes or other mechanisms could be used. The purpose is to keep the impeller stable during pumping of the fluid, thereby making the device more efficient.

The switch line 44 and the switch bulb 54 and bite valve bulb 48 hold an essentially incompressible liquid and thereby form a sealed unit. Compressing the bite valve bulb 48 causes the non-compressible liquid to travel through the switch line 44, thereby causing the switch bulb 54 to expand. The switch bulb is mounted against a pressure switch 74 on the battery holder 72. Thus, when the switch bulb 54 expands, the abutting pressure switch 74 is closed, thereby actuating the motor 68. The motor turns the impeller 84, causing the hydration liquid (or other liquid in the bladder 12, such as an antiseptic liquid or a vitamin supplement or a cleaning liquid) to be pumped from the bladder drain port 20 through the pump housing 34, through the drinking tube 38, and to exit under pressure through the bite valve 50.

In other embodiments, rather than using the bite valve bulb 48, switch bulb 54, and hollow switch line 44, the pump assembly 24 can be activated by a bluetooth (or other frequency or communications protocol) remote switch typically attached to a bicycle handle bar or carried inside the user's pocket. As depicted in FIG. 6, in this embodiment an actuator 100 resides inside the pump 62 between the battery 70 (or other energy storage) and the inner pump cap 58 and attached to battery holder 72. A switch holder 102 is mounted to a handle bar 106 or paddle by a plastic zip tie or other attachment method (such as a half circle mount with two screws). A remote switch 104 snaps into and out of the switch holder 102 so that the remote switch may be removed and carried within frequency range of the in-line pump assembly 24. This enables the personal hydration system 10, with in-line pump assembly 24, to be used in other applications. Pressing the remote switch 104 sends a signal to the actuator 100, which then activates the pump 62 to send pressurized liquid to the bite valve 50 for use. Releasing the remote switch deactivates the pump 62 and stops the flow of liquid from the bite valve 50.

Thus, the present in-line pump assembly 24 overcomes the problem of requiring the user to exert effort or stop breathing to suck liquid from the hydration system. The user may easily share water with others, significantly reducing the risk of disease transmission that sharing of the bite valve might create. The same is true of using the hydrating liquid to clean a wound. The present assembly is also light-weight, takes up very little additional space, and will expel liquid at a generally stable pressure over the life of the battery or other stored energy source. Also, the present design may have sufficient power to pump out several bladders full of liquid without requiring a replacement battery or re-charging of a stored energy source.

According to other embodiments, the in-line pump assembly 24 may be mounted on liquid reservoirs to be used to water plants, transfer liquid from one location to another, administer vitamins or antibiotics to children in war torn or impoverished areas. Furthermore, because the liquid flow is not blocked by the pump 62, should the battery power run out, the user may still suck out the liquid, or may use gravity or pressure on the bladder 12 to force the liquid through the drinking tube 38.

The present delivery mechanism provides a user with hydrating liquid essentially on demand, and without requiring suction or other potentially difficult effort or distraction while exercising or during competition. Thus, the present device has several advantages over the prior art. It will be obvious to those of skill in the art that the invention described in this specification and depicted in the FIGURES may be modified to produce different embodiments. Although embodiments of the invention have been illustrated and described, various modifications and changes may be made by those skilled in the art without departing from the spirit and scope of the invention.

The invention claimed is:

1. An in-line pump assembly configured to attach to a personal hydration system having a bladder containing liquid, the assembly comprising:
    an electrically operated fluid pump contained within an outer pump housing, the pump having a lower end and an upper end, the pump comprising a source of stored energy, a motor, and an impeller, the impeller being in fluid communication through the connector with liquid in the bladder;
    the impeller comprising a plurality of blades at a predetermined angle of attack with respect to fluid flow through the outer pump housing;
    a drinking tube having an input end that abuts the outer pump housing and an output end for delivering liquid to a user;
    a switch line connected to and running the length of the drinking tube, the switch line comprising a bite valve bulb proximate the output end of the drinking tube and a switch bulb proximate the input end of the drinking tube, the switch bulb being contained within the outer pump housing, the switch line containing an essentially incompressible liquid thereby placing the switch bulb and the bite valve bulb in fluid communication so that when the bite valve bulb is compressed, the incompressible liquid causes the switch bulb to expand; and
    a pressure-operated switch contained within the outer pump housing and abutting the switch bulb, the switch configured to selectively engage the pump to cause the pump to turn the impellers and pump fluid from the bladder into the hydration tube when pressure in the switch bulb causes the switch bulb to expand and to push against the switch.

2. The assembly of claim 1 further comprising electrical wiring between the switch and the pump.

3. The assembly of claim 1 wherein the impeller is being shrouded by a tapered wall.

4. The assembly of claim 1 further comprising a connector to attach the in-line pump assembly to the bladder.

5. An apparatus for flipping a pressure switch comprising:
    a switch line containing an essentially incompressible liquid;
    an first expandable bulb formed on a first end of the switch line and adapted to be compressed by action of a user; and
    a second expandable bulb formed on a second end of the switch line, the second bulb adapted to be mounted abutting the pressure switch, the second bulb configured so that compression of the first bulb causes at least a portion of the liquid in the switch line to flow into the second bulb, thereby causing the second bulb to expand and actuate the pressure switch, and releasing the compression on the first bulb causes the liquid to flow out of the second bulb, thereby causing the second bulb to contract and cease to actuate the pressure switch, thereby stopping the flow of liquid.

6. A pump assembly configured to attach to a personal hydration system having a bladder containing liquid, the assembly comprising:
    a pump comprising a source of stored energy, a motor, and an impeller;
    a drinking tube for delivering liquid from the pump to a user;
    a switch line connected to and running the length of the drinking tube, the switch line comprising a bite valve bulb proximate the output end of the drinking tube and a switch bulb proximate the input end of the drinking tube, the switch bulb being contained within an outer pump housing, the switch line containing an essentially incompressible liquid thereby placing the switch bulb and the bite valve bulb in fluid communication so that when the bite vale bulb is compressed, the incompressible liquid causes the switch bulb to expand; and
    a pressure-operated switch contained within the outer pump housing and abutting the switch bulb, the switch configured to selectively engage the pump to cause the pump to turn the impellers and pump fluid from the bladder into the hydration tube when pressure in the switch bulb causes the switch bulb to expand and to push against the switch.

7. The assembly of claim 6 wherein the impeller is shrouded by a tapered wall.

8. The assembly of claim 6 further comprising a connector to attach the in-line pump assembly to the bladder.

9. The assembly of claim 6 in which the pump further comprises a source of stored energy.

10. The assembly of claim 6 in which the impeller is configured to be in fluid communication with liquid in the bladder.

11. The assembly of claim 6 in which the impeller comprises a plurality of blades at a predetermined angle of attack with respect to fluid flow through the assembly.

12. The assembly of claim 6 further comprising a drinking tube having an input end configured for fluid communication with liquid passing the impeller and an output end for delivering the liquid to a user.

13. The assembly of claim 6 further comprising electrical wiring between the switch and the pump.

14. The assembly of claim 6 further compromising a top cap with arms that fit in notches in an outer pump housing to stabilize the pump while allowing flow of liquid through the assembly.

15. The assembly of claim 6 further comprising stabilizing posts at an end of the pump to prevent the impeller from contacting a tapered end cap or an outer pump housing.

* * * * *